(12) United States Patent
Spates, IV et al.

(10) Patent No.: US 11,722,483 B2
(45) Date of Patent: Aug. 8, 2023

(54) STRUCTURE-BASED ACCESS CONTROL

(71) Applicant: GOOGLE LLC, Mountain View, CA (US)

(72) Inventors: Mark Spates, IV, San Francisco, CA (US); Vincent Yanton Mo, Sunnyvale, CA (US); Zhenguo Guan, Cupertino, CA (US); David Roy Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/962,769

(22) Filed: Oct. 10, 2022

(65) Prior Publication Data

US 2023/0030076 A1    Feb. 2, 2023

Related U.S. Application Data

(63) Continuation of application No. 16/609,569, filed as application No. PCT/US2018/062841 on Nov. 28, 2018, now Pat. No. 11,470,078.

(Continued)

(51) Int. Cl.
*H04L 9/40* (2022.01)
*G06F 16/23* (2019.01)

(52) U.S. Cl.
CPC ...... *H04L 63/0853* (2013.01); *G06F 16/2379* (2019.01)

(58) Field of Classification Search
CPC ..... H04L 63/0853; H04L 63/10; H04L 63/08; H04L 63/0807; H04L 12/282; G06F 16/2379; G06F 3/167; G06F 21/31
See application file for complete search history.

(56) References Cited

U.S. PATENT DOCUMENTS 9,191,382 B1   11/2015   Hornung et al.
9,674,187 B1   6/2017   Ngo et al.
(Continued)

FOREIGN PATENT DOCUMENTS

CN   105812140   7/2016
CN   106412083   2/2017
(Continued)

OTHER PUBLICATIONS

G. Sampemane, P. Naldurg and R. H. Campbell, "Access control for Active Spaces," 18th Annual Computer Security Applications Conference, 2002. Proceedings., Las Vegas, NV, USA, 2002, pp. 343-352. (Year: 2002).*

(Continued)

*Primary Examiner* — Michael R Vaughan
(74) *Attorney, Agent, or Firm* — Gray Ice Higdon

(57) ABSTRACT

The present disclosure provides systems and methods that perform structure-based access control. In particular, rather than relying upon a user-specific credential scheme, which can require manual sharing of user-specific credentials and/or switching between the multiple accounts to access the particular devices, applications, or services associated with such accounts, the systems and methods of the present disclosure facilitate user credentials to be inherited by or otherwise assigned to a structure identifier associated with a structure (e.g., a home in which the user resides), thereby generating a set of structure credentials. This enables other users in the structure, who may be part of a collaborative user group, to access devices, applications, and/or services using the structure credentials.

20 Claims, 4 Drawing Sheets

Related U.S. Application Data

(60) Provisional application No. 62/591,934, filed on Nov. 29, 2017.

(56) References Cited

U.S. PATENT DOCUMENTS

| | | | |
|---|---|---|---|
| 2017/0024378 A1 | 1/2017 | Sharma et al. | |
| 2017/0132909 A1 | 5/2017 | Rabb et al. | |
| 2017/0142124 A1 | 5/2017 | Mukhin et al. | |
| 2017/0318075 A1 | 11/2017 | Liensberger et al. | |
| 2019/0020636 A1* | 1/2019 | Gehring | H04L 9/088 |
| 2019/0124049 A1 | 4/2019 | Bradley et al. | |
| 2020/0067916 A1 | 2/2020 | Spates, IV et al. | |

FOREIGN PATENT DOCUMENTS

| | | |
|---|---|---|
| CN | 106685978 | 5/2017 |
| CN | 106992989 | 7/2017 |

OTHER PUBLICATIONS

I. Armac, A. Panchenko, M. Pettau and D. Retkowitz, "Privacy-Friendly Smart Environments," 2009 Third International Conference on Next Generation Mobile Applications, Services and Technologies, Cardiff, UK, 2009, pp. 425-431. (Year: 2009).*

China National Intellecutal Property Administration; Notice of Grant issued for Application No. 201880076605.5, 6 pages, dated Jul. 20, 2022.

Ma Guojun et al.; An End-to-End Security Scheme of the Internet of Things; Information Network Security; 9 pages; dated Oct. 10, 2017.

European Patent Office; Intention to Grant issued in Application No. 18829546.3, 42 pages, dated Oct. 24, 2022.

* cited by examiner

STRUCTURE-BASED ACCESS CONTROL

FIELD

The present disclosure relates generally to managing access control for devices and/or services, such as web services or applications. More particularly, the present disclosure relates to use of a structure identifier for managing access control within a structure.

BACKGROUND

There is a proliferation of smart, network-connected computing devices such as sound speakers, home alarms, door locks, cameras, lighting systems, treadmills, weight scales, smart beds, irrigation systems, garage door openers, appliances, baby monitors, fire alarms, or other smart computing devices. These smart devices can be located, for instance, within the confines of a physical structure (e.g., a home) and a user may desire to interact with or otherwise control such smart devices. To do so, the user may use a control computing device (e.g., a smartphone, a smart speaker, etc.) to wirelessly communicate with the smart devices, for instance, via a network. Alternatively, the user may directly interact with the smart device and, in such instance, the smart device can be viewed as the control computing device.

Likewise, the control computing device and/or one or more additional smart computing devices may operate to enable the user to engage with or control one or more applications and/or web services. As one example, a user may request that music be streamed and played via a music streaming application/web service executed by the control computing device and/or one or more additional smart computing devices. As another example, a user may request to add a new event to a calendar managed by a calendar application executed by the control computing device and/or one or more additional smart computing devices.

Typically however, smart devices, applications, and/or web services are controlled using user-specific credentials that are associated with a specific user's identity. For example, a first user may enter his specific user credentials to enable the music streaming application to access his web account, while a second user may enter her specific user credentials to enable the calendar application to access her calendar.

This user-specific credential structure does not account for the fact that structures such as homes often include a collaborative user group. Therefore, this user-specific credential scheme causes a number of problems.

As one example problem, although certain existing control computing devices allow multiple accounts to be set up, these existing devices require constant switching between the multiple accounts to access the particular devices, applications, or services associated with such accounts. For example, a husband may currently be listening to music using his specific user credentials for a music streaming application. To access a calendar application associated with his wife's account, the husband may need to switch the control device to his wife's profile by saying, for example, "Assistant, switch accounts" or "Assistant, switch to Jennifer's profile."

Constantly switching between accounts can be time consuming, bothersome, and confusing, for example by requiring constant checking of which profile is currently active. Furthermore, by switching the control device to his wife's account, the husband may lose access to the music streaming application associated with his account.

Furthermore, certain control devices can operate (e.g., to provide access control) primarily or solely on the basis of voice recognition. Thus, for such control devices, the husband may be unable to switch to his wife's account to access the calendar application even if he wants to, since the control device will only switch to the wife's account when her voice is recognized.

As a work-around to the above-described problem, the first user can manually share his credentials with the second user (e.g., by verbally telling the second user the credentials). The second user can then perform an additional setup process to associate the first user's user-specific credentials with the second user's user-specific account.

This engenders its own problems, however. For one, the first user may not be comfortable providing his actual credentials (e.g., password) to the second user. Second, this work-around requires that an additional set-up procedure be performed for each instance of credential sharing (e.g., for each additional user and/or for each account being shared), which is time consuming and a frustrating user experience. Thus, this work-around is not easily extensible to new users who may, for example, only temporarily join a control group.

SUMMARY

Aspects and advantages of embodiments of the present disclosure will be set forth in part in the following description, or can be learned from the description, or can be learned through practice of the embodiments.

One aspect of the present disclosure is directed to a computer system. The computer system includes one or more computing devices physically located within a physical structure. The one or more computing devices include at least one control computing device. The at least one control computing device includes one or more processors and one or more non-transitory computer-readable media that store instructions that, when executed by the one or more processors, cause the at least one control computing device to perform operations. The operations include receiving, from a first user, a first set of user credentials associated with one or more of: a first computing device of the one or more computing devices, a first application, or a first web service. The first set of user credentials is associated with a first user account associated with the first user. The operations include determining a structure identifier associated with the structure. The operations include assigning the first set of user credentials to the structure identifier to generate a first set of structure credentials. The operations include receiving, from a second user located within the structure, a request to control the one or more of the first computing device, the first application, or the first web service. The operations include in response to the request received from the second user, using the first set of structure credentials to control the one or more of the first computing device, the first application, or the first web service.

Another aspect of the present disclosure is directed to a computer-implemented method. The method includes receiving, by one or more computing devices, a first set of user credentials from a first user. The first set of user credentials is associated with one or more of: a first computing device of the one or more computing devices, a first application, or a first web service. The first set of user credentials is associated with a first user account associated with the first user. The method includes determining, by the one or more computing devices, a structure identifier associated with a physical structure in which the first user is physically located. The method includes assigning, by the one or more computing devices, the first set of user credentials to the structure identifier to generate a first set of structure credentials. The method includes receiving, by the one or more computing devices from a second user located within the structure, a request to control the one or more of the first computing device, the first application, or the first web service. The method includes, in response to the request received from the second user, using, by the one or more computing devices, the first set of structure credentials to control the one or more of the first computing device, the first application, or the first web service.

Another aspect of the present disclosure is directed to a smart home control computing device. The smart home control computing device includes one or more processors and one or more non-transitory computer-readable media that store instructions that, when executed by the one or more processors, cause the smart home control computing device to perform operations. The operations include receiving, from a first user, a first set of user credentials associated with one or more of: a first computing device, a first application, or a first web service. The first set of user credentials is associated with a first user account associated with the first user. The operations include determining a home identifier associated with a home. The operations include assigning the first set of user credentials to the home identifier to generate a first set of home credentials. The operations include receiving, from a second user located within the home, a request to control the one or more of the first computing device, the first application, or the first web service. The operations include, in response to the request received from the second user, using the first set of home credentials to control the one or more of the first computing device, the first application, or the first web service.

The one or more aspects may optionally include one or more of the following features. The at least one control computing device may comprise a smart speaker. The physical structure may comprise a dwelling and the first and second users comprises inhabitants of the dwelling. The first computing device may comprise the control computing device. Assigning the first set of user credentials to the structure identifier may comprise: using the first set of user credentials to obtain an authentication token from a web server; and storing the authentication token at the control computing device. Receiving, from the second user located within the structure, the request to control may comprise receiving, from a second computing device associated with the second user, the request to control the first application, wherein the first application is not installed on the second computing device. The operations may further comprise: receiving, from the second user, a second set of user credentials associated with the one or more of the first computing device, the first application, or the first web service, wherein the second set of user credentials are associated with a second user account associated with the second user; and assigning the second set of user credentials to the structure identifier to generate a second set of structure credentials. The operations may further comprise: receiving, from the second user, a second request to control the one or more of the first computing device, the first application, or the first web service, wherein the second request comprises a verbal request; performing voice recognition on the second request to recognize the second user; and in response to the second request and recognition of the second user, automatically using the second set of structure credentials to control the one or more of the first computing device, the first application, or the first web service. The operations may further comprise: receiving, from the second user, a second request to control the one or more of the first computing device, the first application, or the first web service; in response to the second request, iteratively and individually analyzing each set of structure credentials assigned to the structure identifier to identify a first available set of structure credentials that enable satisfaction of the second request; and using the first available set of structure credentials to control the one or more of the first computing device, the first application, or the first web service. The operations may further comprise: receiving, from the second user, a second request to control the one or more of the first computing device, the first application, or the first web service; in response to the second request, analyzing each set of structure credentials assigned to the structure identifier to identify a premier set of structure credentials that have, relative to other sets of structure credentials, a premier group of permissions; and using the premier set of structure credentials to control the one or more of the first computing device, the first application, or the first web service. The operations may further comprise: receiving, from the second user, a second request to control the one or more of the first computing device, the first application, or the first web service; in response to the second request, determining that a plurality of sets of structure credentials are available to enable satisfaction of the second request; and in response to determining that the plurality of sets of structure credentials are available, engaging in a question and answer routine with the second user to disambiguate between the plurality of sets of structure credentials.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
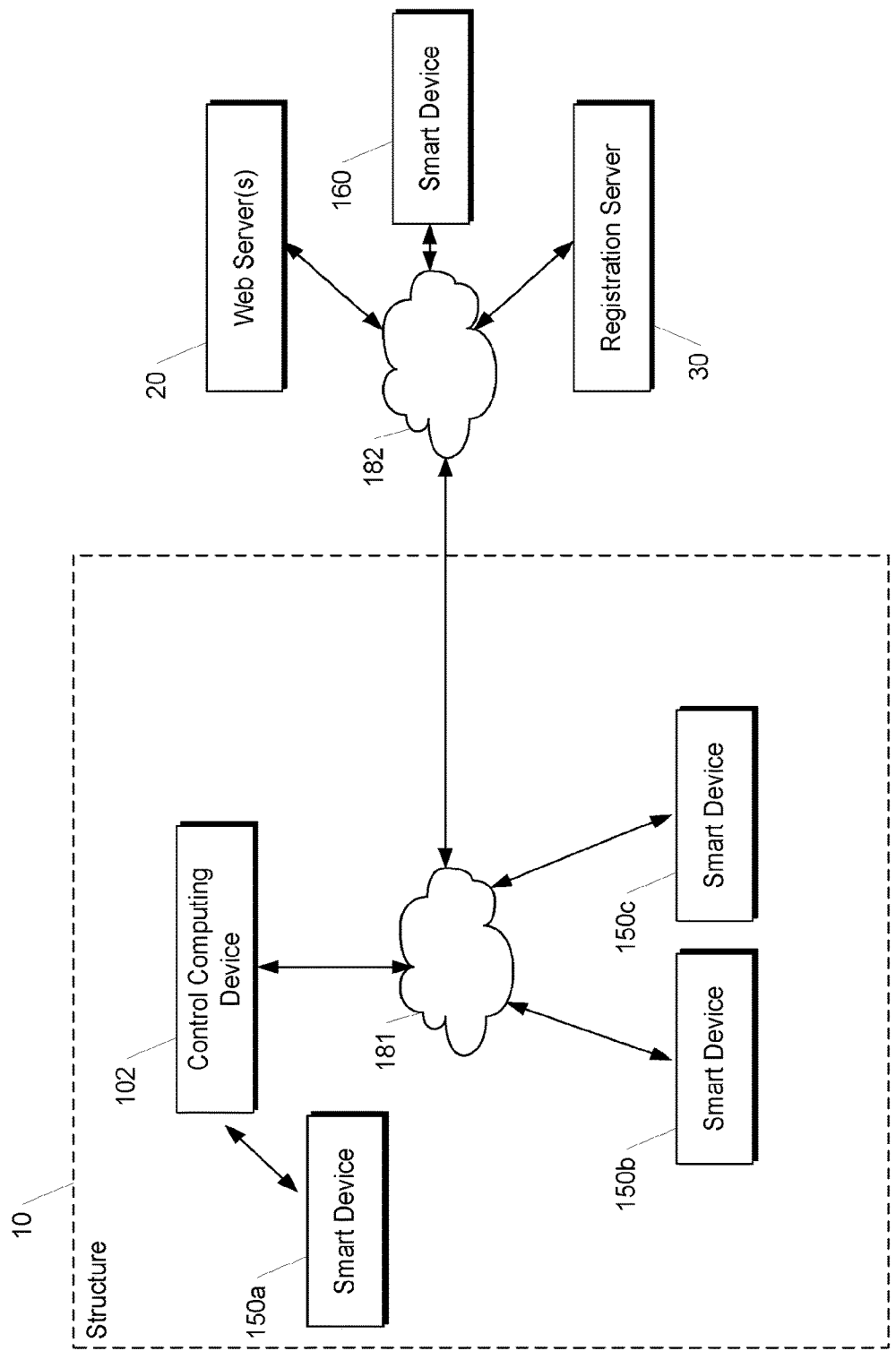
FIG. 1 depicts a block diagram of an example computing system according to example embodiments of the present disclosure.

Example aspects of the present disclosure are directed to systems and methods to perform structure-based access control. In particular, rather than relying upon a user-specific credential scheme, which can, for example, require manual sharing of account credentials and/or switching between the multiple accounts to access the particular devices, applications, or services associated with such accounts, the systems and methods of the present disclosure facilitate user credentials to be inherited by or otherwise assigned to a structure identifier associated with a structure (e.g., a home in which the user resides), thereby generating a set of structure credentials. This enables other users in the structure, who may be part of a collaborative user group, to access devices, applications, and/or services using the structure credentials, thereby eliminating the onerous requirement of performing multiple account set up routines and/or switching between user-specific accounts to access different devices/services/etc. respectively associated with such accounts. Thus, in one example, a husband can assign his specific user credentials for a music streaming application to the home. Thereafter, various users (e.g., a wife, a son, and/or a visiting friend, etc.) that are located within the home can access the music streaming application, for example, without requiring the presence of the husband and/or manual sharing of the husband's credentials.

More particularly, one or more computing devices can be physically located within a physical structure such as a building, house, vehicle, etc. For example, the computing devices can include smart, network-connected computing devices such as sound speakers, home alarms, door locks, cameras, lighting systems, treadmills, weight scales, smart beds, irrigation systems, garage door openers, appliances (e.g., refrigerator, HVAC, dishwasher, stove, etc.), baby monitors, fire alarms, or other smart computing devices. These devices can offer or provide various services or operations. For example, the services or operations can be performed by computer application(s) executed by the device(s).

In some instances, one of the computing devices can operate or be used as a control computing device. The control computing device can be one of the smart devices described above or can be a separate computing device with a primary purpose other than controlling the smart devices. As one example, the control computing device can be a smart speaker that includes and implements an intelligent personal assistant. A user can interact with the control computing device to access or otherwise control one or more of the smart devices. A user can also interact with the control computing device to control management of the one or more smart devices.

To provide an example, the user may issue a voice command to the control computing device that requests access to or control of the smart device(s) (e.g., "Turn the thermostat down two degrees."). The control computing device can process the voice command, determine whether the user is authorized to control such device(s) and, if so, communicate with the device(s) (e.g., wirelessly via a network) to effectuate the actions requested by the voice command. As an alternative example, the user may directly interact with the smart device (e.g., the smart thermostat) and, in such instance, the smart device can be considered to be the control computing device.

Likewise, the control computing device and/or one or more additional smart computing devices may operate to enable the user to engage with, manage, or otherwise control one or more applications and/or web services. As one example, a user may request that music be streamed and played via a music streaming application/web service executed by the control computing device and/or one or more additional smart computing devices. As another example, a user may request to add a new event to a calendar managed by a calendar application executed by the control computing device and/or one or more additional smart computing devices.

According to an aspect of the present disclosure, rather than relying upon a user-specific credential scheme, the systems and methods of the present disclosure facilitate user credentials to be inherited by or otherwise assigned to a structure identifier associated with a structure (e.g., a home in which the user resides), thereby generating a set of structure credentials. Thus, the present disclosure provides a structure-based credential scheme.

As one example, a control computing device can receive a first set of user credentials from a first user. The first set of user credentials can be associated with a first computing device of the one or more computing devices included in the structure, a first application, and/or a first web service. The first set of user credentials can be associated with a first user account associated with the first user.

The first user can indicate that he or she would like to assign the first set of user credentials to the structure (e.g., via a user input such as, for example, a voice command). In one example, the first user may have previously been designated as a "manager" of the control computing device and/or one or more additional smart devices. For example, the first user may be a user that deployed, installed, or otherwise set up the control computing device within the structure.

The control computing device can determine a structure identifier associated with the structure. As an example, when first deployed by a user, such user may have entered as particular name or other identifier for the corresponding structure (e.g., "Family Lakehouse"). As another example, an identifier may have been programmed into the control computing device by the manufacturer and such identifier can be assigned to the structure as the structure identifier when the control computing device is first deployed into the structure. As another example, when first deployed within the structure, the control computing device can interact with a registration server to receive a structure identifier.

The control computing device can assign the first set of user credentials to the structure identifier to generate a first set of structure credentials. For example, such assignment operation can be performed in response to a user instruction that he or she would like to assign the first set of user credentials to the structure (e.g., via a user input such as, for example, a voice command). In some implementations, assigning the first set of user credentials to the structure identifier can include using the first set of user credentials to obtain an authentication token from a web server and storing the authentication token at the control computing device. In other implementations, assigning the first set of user credentials to the structure identifier can include storing the first set of user credentials at the control computing device and designating such credentials as structure credentials. In yet further examples, the mapping between the structure identifier and the authentication token can be stored at a server computing device (e.g., "in the cloud").

Thus, in some instances, the control computing device and/or the web server can perform an authentication routine on the set of credentials (e.g., prior to and/or subsequent to assigning the set of credentials to the structure) to authenticate the credentials. Authenticating the set of credentials can include comparing the set of credentials against an authenticated set of credentials (e.g., checking to see if the correct password has been provided).

After generating the first set of structure credentials, the control computing device can receive, from a second user located within the structure, a request (e.g., a voice command) to control the first computing device, the first application, and/or the first web service with which the first set of structure credentials are associated. In response to the request received from the second user, the control computing device can use the first set of structure credentials to control the one or more of the first computing device, the first application, and/or the first web service (e.g., to effectuate the request received by the second user).

In such fashion, multiple users within a structure, who may be part of a collaborative user group, can access devices, applications, and/or services using structure credentials, thereby eliminating the onerous requirement of switching between user-specific accounts to access different devices/services/etc. respectively associated with such accounts. Thus, in one example, a husband can assign his specific user credentials for a music streaming application to the home. Thereafter, various users (e.g., a wife) within the home can access the music streaming application while still accessing other device/services/etc. that are not assigned to the husband's specific user account (e.g., a calendar application associated with the wife's user account).

As one example technical effect and benefit of this approach, the use of processing resources to perform switching between user-specific accounts and/or responding to queries can be eliminated. Reducing the amount of processing resources expended can result in improved device power performance, particularly for battery powered devices. As another example technical effect and benefit, the control computing device may no longer be required to sign in to different (e.g., switch between) user-specific accounts to access various web services. By eliminating the need to communicate over a network (e.g., the Internet) with the web service to switch active accounts, network traffic can be reduced.

As another example technical effect and benefit, structure-based access control enables control to be multi-modal. In one example, the structure-based access control proposed herein can enable control of an application to be extended to control devices that do not have such application installed thereon. For example, a first computing device can have a first application installed thereon and can use a first set of structure credentials derived from a first user account associated with a first user. A second user can interact with a second computing device associated with the second user to control the first computing device to execute the first application using the first set of structure credentials. Thus, the first application can be executed by the first computing device using credentials derived from the first user based on a request from the second computing device associated with the second user, where the second computing device does not have the first application installed thereon.

Additional sets of user credentials can also be inherited by or otherwise assigned to the structure to generate additional sets of structure credentials. For example, the control computing device can receive, from a second user, a second set of user credentials associated with the first computing device, the first application, and/or the first web service. The second set of user credentials can be associated with a second user account associated with the second user. The control computing device can (e.g., based on instructions to do so from the second user) assign the second set of user credentials to the structure identifier to generate a second set of structure credentials. The second user can be designated as a second manager or may not be designated as a second manager.

According to another aspect of the present disclosure, in some implementations, the ability to use or access sets of structure credentials can be extended to only users that have been authenticated (e.g., by the control computing device). Thus, once a user is authenticated, the user can access the structure and then use any of the sets of structure credentials (e.g., the authorization tokens associated with the structure credentials) that have been assigned to the structure. In contrast, users who have not been authenticated may not be able to use or access sets of structure credentials.

However, in some implementations, a user (e.g., a manager) can adjust settings that control whether a new user must be authenticated to access or use a particular set of structure credentials. For example a first user can assign his credentials for a music streaming application to the structure to generate a first set of structure credentials. The first user can also assign his credentials for a calendar application to the structure to generate a second set of structure credentials. The first user can control settings such that any user (including non-authenticated users) can access and use the first set of structure credentials to control the music streaming application while only authenticated users can access and use the second set of structure credentials to control the calendar application.

To provide another example of the concept described immediately above, suppose a first user has credentials to control a smart thermostat and a second user has credentials to control a smart lighting system. In a setup phase, the first user can create the structure and assign himself to the structure as an owner. The first user can assign his credentials to control the smart thermostat to be inherited by the structure. Next, the first user can assign the second user to the structure as an owner. The second user can assign her credentials to control the smart lighting system to be inherited by the structure. Then, in a controlling phase, the first user can send a command to turn on lights. The command is sent to the control computing device, which has the first user's credentials. This gets routed to the structure. Since the first user is an owner of the structure, the authentication passes and the command can then use the structure's credentials (inherited from the second user) to control the light. The example authentication steps described here can ensure that only owners of the structure can issue commands. This example is provided as one example of possible implementations of the present disclosure. The present disclosure is not limited to operation as described in this example.

According to another aspect of the present disclosure, where multiple sets of structure credentials have been generated which enable access to or control of the same device, application, and/or service, the present disclosure provides a number of different techniques to resolve conflicts between such multiple sets of structure credentials and/or additional sets of user-specific credentials. In particular, after multiple sets of credentials have been received for a particular device, application, and/or service, a control computing device can receive a new request to control the particular device, application, and/or service and, in response, can perform various conflict resolution techniques to determine which set of credentials should be used.

As one example conflict resolution technique, the control computing device can iteratively and individually analyze each set of structure credentials assigned to the structure identifier to identify a first available set of structure credentials that enable satisfaction of the newly received request. Thus, for example, the control computing device can start with a first set of structure credentials and assess whether such structure credentials can be used to satisfy the request.

If so, the control computing device can use such first set of structure credentials; and, if not, then the control computing device can move to a second set of structure credentials and assess whether such structure credentials can be used to satisfy the request. Thus, the control computing device can use the first available set of structure credentials to control the one or more of the particular device, application, and/or service.

As another example conflict resolution technique, the control computing device can analyze each set of structure credentials assigned to the structure identifier to identify a premier set of structure credentials that have, relative to other sets of structure credentials, a premier group of permissions. As one example, a first set of structure credentials for a music streaming application can correspond to a standard account type while a second set of structure credentials for a the music streaming application can correspond to a premium account type. Thus, the control computing device can analyze the first and second sets of structure credentials and determine that the second set of structure credentials is the premier set of credentials that provides a premier group of permissions. As such, the control computing device can use the premier set of structure credentials to control the particular device, application, and/or service (e.g., the music streaming application).

As yet another example conflict resolution technique, in response to determining that the plurality of sets of structure credentials are available for us in fulfilling the request, the control computing device can engage in a question and answer routine with the second user to disambiguate between the plurality of sets of structure credentials. For example, the question and answer routine can include the control computing device providing a question (e.g., play an audio question over a speaker) and receiving an answer from the user (e.g., receiving a voice answer from the user). For example, the question can request that the user specify one of the available sets of structure credentials and the answer can specify a particular set of structure credentials.

In another example, the new request received by the control computing device can be a verbal request or command. As another example conflict resolution technique, the control computing device can perform voice recognition on the new verbal request to recognize a particular user that verbalized the new request. In response to the new request and further in response to recognition of the particular user, the control computing device can automatically use a particular set of structure credentials that are associated with the recognized user to control the device, application, and/or service. For example, the particular set of structure credentials that are associated with the recognized user can have been derived from a set of user credentials associated with a user account of the recognized user.

Thus, the structure-based access control enables multiple users to assign their authorization tokens to the structure. Thereafter, once a user is authenticated, the user can access the structure and then all the authorization tokens on the structure.

Further, in some instances, the control computing device can communicate with one or more remote computing devices to perform the operations described herein. For example, the control computing device can send some or all of the information received from users to one or more server computing device(s) (e.g., located in "the cloud") and the server computing device(s) can perform some or all of the operations (e.g., the conflict resolution operations) ascribed to the control computing device.

With reference now to the Figures, example embodiments of the present disclosure will be discussed in further detail.

Example Devices And Systems

FIG. 1 depicts a block diagram of an example computing system according to example embodiments of the present disclosure. Portions of the example computing system can be physically located within a physical structure 10. Example structures 10 include a building, house, vehicle, or other structures. A structure can also refer to a specific portion or division of a building such as different floors of the building; different office spaces within a building; or similar divisions of building space. For example, Company A's office space within a building can be a first structure while Company B's office space within the building can be a second structure.

Thus, although the example of a house with rooms is used as a physical structure in the present disclosure, the systems and methods of the present disclosure can be applied more generally to access control for a group of users using the device at a geographic coordinate or range of coordinates defining a physical place. For example, further to the above, a structure can more generally mean (a) one unit or subunit of a permanent or temporary physical structure (e.g., a house, or a condo/townhome in a multiunit structure, or a hotel room, office, or storefront) at the place or (b) a group of such structures commonly accessible to the user group at the place (e.g., a house and in-law unit or detached garage on the same property, a suite of office units in a complex, etc.). As another example, a structure can also be a vehicle or groups of vehicles.

As examples, a control computing device 102 and a plurality of smart devices 150*a-c* can be physically located with the structure 10. For example, the control computing device 102 can itself be a smart device and/or one of the smart devices 150*a-c* can operate as a control computing device.

Example smart devices can include smart, network-connected computing devices such as sound speakers, home alarms, door locks, cameras, lighting systems, treadmills, weight scales, smart beds, irrigation systems, garage door openers, appliances (e.g., refrigerator, HVAC, dishwasher, stove, etc.), baby monitors, fire alarms, televisions, display devices, or other smart computing devices. These devices can offer or provide various services or operations. For example, the services or operations can be performed by computer application(s) executed by the device(s). Smart devices are not required to be network connected.

The control computing device 102 can communicate with the smart devices using a variety of different communications protocols, methods, hardware, etc., and combinations thereof. As one example, the control computing device 102 can communicate with the smart device 150*a* using short range wireless communications techniques such as Bluetooth, ZigBee, Bluetooth Low Energy, infrared signals, optical signals, etc. As another example, the control computing device can communicate with the smart devices 150*b-c* over a local area network 181. For example, the local area network 181 can be a WiFi network associated with the structure 10. The control computing device 102 can also communicate with smart devices using wired connections such as, for example, Ethernet connections.

The control computing device 102 and/or the plurality of smart devices 150*a-c* can also communicate with one or more computing devices external to the structure 10. For example, such computing devices external to the structure 10 can include one or more web servers 20, an additional smart device 160, and/or a registration server 30. For example, communications between devices located within the structure 10 and devices external to the structure can occur over a wide area network 182. For example, the wide area network 182 can include the Internet, cellular networks, or the like. Communications between devices located within the structure 10 and devices external to the structure can flow through the local area network 181 but are not required to do so.

Thus, the control computing device 102 can itself be one of the smart devices described above or can be a separate computing device with a primary purpose other than controlling the smart devices. As one example, the control computing device 102 can be a smart speaker that includes and implements an intelligent personal assistant. As another example, the control computing device 102 can be a smartphone. In some implementations where the control computing device 102 is a smartphone (or other mobile device), the smartphone can be assigned to the structure and structure-based access control utilized via the smartphone at a given time, regardless of whether the smartphone is actually near or within the structure at the given time. In some other implementations where the control computing device 102 is a smartphone (or other mobile device), structure-based access control via the smartphone can be selectively activated only when the smartphone is determined to be near and/or within the structure. For example, structure-based access control via the smartphone can be activated when the smartphone detects and/or is connected to a Wi-Fi network assigned to the structure, when the smartphone detects and/or is connected to one or more smart devices assigned to the structure, and/or when a current location of the smartphone is within or near a location assigned to the structure.

A user can interact with the control computing device 102 to access or otherwise control one or more of the smart devices. A user can also interact with the control computing device 102 to control management of the one or more smart devices.

To provide an example, the user may issue a voice command to the control computing device 102 that requests access to or control of the smart device(s) (e.g., "Turn the thermostat down two degrees."). The control computing device 102 can process the voice command, determine whether the user is authorized to control such device(s) and, if so, communicate with the device(s) (e.g., wirelessly via a network) to effectuate the actions requested by the voice command. As an alternative example, the user may directly interact with the smart device (e.g., the smart thermostat) and, in such instance, the smart device can be considered to be the control computing device 102.

Likewise, the control computing device 102 and/or one or more additional smart computing devices may operate to enable the user to engage with, manage, or otherwise control one or more applications and/or web services. As one example, a user may request that music be streamed and played via a music streaming application/web service executed by the control computing device 102 and/or one or more additional smart computing devices. As another example, a user may request to add a new event to a calendar managed by a calendar application executed by the control computing device 102 and/or one or more additional smart computing devices.

According to an aspect of the present disclosure, rather than relying upon multiple different user-specific accounts, which can require switching between the multiple accounts to access the particular devices, applications, or services associated with such accounts, the systems and methods of the present disclosure facilitate user credentials to be inherited by or otherwise assigned to a structure identifier associated with the structure 10 (e.g., a home in which the user resides), thereby generating a set of structure credentials.

As one example, a control computing device 102 can receive a first set of user credentials from a first user. The first set of user credentials can be associated with a first computing device (e.g., smart device 150b) of the one or more computing devices included in the structure 10, a first application, and/or a first web service. The first set of user credentials can be associated with a first user account associated with the first user.

The first user can indicate that he or she would like to assign the first set of user credentials to the structure 10 (e.g., via a user input such as, for example, a voice command). In one example, the first user may have previously been designated as a "manager" of the control computing device 102 and/or one or more additional smart devices (e.g., device 150b). For example, the first user may be a user that deployed, installed, or otherwise set up the control computing device 102 within the structure.

The control computing device 102 can determine a structure identifier associated with the structure 10. As an example, when first deployed by a user, such user may have entered a particular name or other identifier for the corresponding structure 10 (e.g., "Family Lakehouse"). As another example, an identifier may have been programmed into the control computing device 102 by the manufacturer and such identifier can be assigned to the structure 10 as the structure identifier when the control computing device 102 is first deployed into the structure 10. As another example, when first deployed within the structure 10, the control computing device 102 can interact with the registration server 30 to receive a structure identifier which is assigned to the structure 10.

The control computing device 102 can assign the first set of user credentials to the structure identifier to generate a first set of structure credentials. For example, such assignment operation can be performed in response to a user instruction that he or she would like to assign the first set of user credentials to the structure 10 (e.g., via a user input such as, for example, a voice command). In some implementations, assigning the first set of user credentials to the structure identifier can include using the first set of user credentials to obtain an authentication token from the web server 20 and storing the authentication token at the control computing device 102. In other implementations, assigning the first set of user credentials to the structure identifier can include storing the first set of user credentials at the control computing device 102 and designating such credentials as structure credentials.

After generating the first set of structure credentials, the control computing device 102 can receive, from a second user located within the structure 10, a request (e.g., a voice command) to control the first computing device (e.g., device 150b), the first application, and/or the first web service with which the first set of structure credentials are associated. In response to the request received from the second user, the control computing device 102 can use the first set of structure credentials to control the one or more of the first computing device, the first application, and/or the first web service (e.g., to effectuate the request received by the second user).

In such fashion, multiple users within a structure, who may be part of a collaborative user group, can access devices, applications, and/or services using structure credentials, thereby eliminating the onerous requirements associated with user-specific credential schemes, such as, for example, manual sharing of user-specific credentials and/or switching between user-specific accounts to access different devices/services/etc. respectively associated with such accounts. Thus, in one example, a husband can assign his specific user credentials for a music streaming application to the home. Thereafter, various users (e.g., a wife, a son, and/or a visiting friend, etc.) that are located within the home can access the music streaming application or example, without requiring the presence of the husband and/or manual sharing of the husband's credentials.

Additional sets of user credentials can also be inherited by or otherwise assigned to the structure 10 to generate additional sets of structure credentials. For example, the control computing device 102 can receive, from a second user, a second set of user credentials associated with the first computing device, the first application, and/or the first web service. The second set of user credentials can be associated with a second user account associated with the second user. The control computing device 102 can (e.g., based on instructions to do so from the second user) assign the second set of user credentials to the structure identifier to generate a second set of structure credentials. The second user can be designated as a second manager or may not be designated as a second manager.

According to another aspect of the present disclosure, where multiple sets of structure credentials have been generated which enable access to or control of the same device, application, and/or service, the present disclosure provides a number of different techniques to resolve conflicts between such multiple sets of structure credentials and/or additional sets of user-specific credentials. In particular, after multiple sets of credentials have been received for a particular device, application, and/or service, a control computing device 102 can receive a new request to control the particular device, application, and/or service and, in response, can perform various conflict resolution techniques to determine which set of credentials should be used.

As one example conflict resolution technique, the control computing device 102 can iteratively and individually analyze each set of structure credentials assigned to the structure identifier to identify a first available set of structure credentials that enable satisfaction of the newly received request. Thus, for example, the control computing device 102 can start with a first set of structure credentials and assess whether such structure credentials can be used to satisfy the request. If so, the control computing device 102 can use such first set of structure credentials; and, if not, then the control computing device 102 can move to a second set of structure credentials and assess whether such structure credentials can be used to satisfy the request. Thus, the control computing device 102 can use the first available set of structure credentials to control the one or more of the particular device, application, and/or service.

As another example conflict resolution technique, the control computing device 102 can analyze each set of structure credentials assigned to the structure identifier to identify a premier set of structure credentials that have, relative to other sets of structure credentials, a premier group of permissions. As one example, a first set of structure credentials for a music streaming application can correspond to a standard account type while a second set of structure credentials for the music streaming application can correspond to a premium account type. Thus, the control computing device 102 can analyze the first and second sets of structure credentials and determine that the second set of structure credentials is the premier set of credentials that provides a premier group of permissions. As such, the control computing device 102 can use the premier set of structure credentials to control the particular device, application, and/or service (e.g., the music streaming application).

As yet another example conflict resolution technique, in response to determining that the plurality of sets of structure credentials are available for us in fulfilling the request, the control computing device 102 can engage in a question and answer routine with the second user to disambiguate between the plurality of sets of structure credentials. For example, the question and answer routine can include the control computing device 102 providing a question (e.g., play an audio question over a speaker) and receiving an answer from the user (e.g., receiving a voice answer from the user). For example, the question can request that the user specify one of the available sets of structure credentials and the answer can specify a particular set of structure credentials.

In another example, the new request received by the control computing device 102 can be a verbal request or command. As another example conflict resolution technique, the control computing device 102 can perform voice recognition on the new verbal request to recognize a particular user that verbalized the new request. In response to the new request and further to response to recognition of the particular user, the control computing device 102 can automatically use a particular set of structure credentials that are associated with the recognized user to control the device, application, and/or service. For example, the particular set of structure credentials that are associated with the recognized user can have been derived from a set of user credentials associated with a user account of the recognized user.

Figure 2:
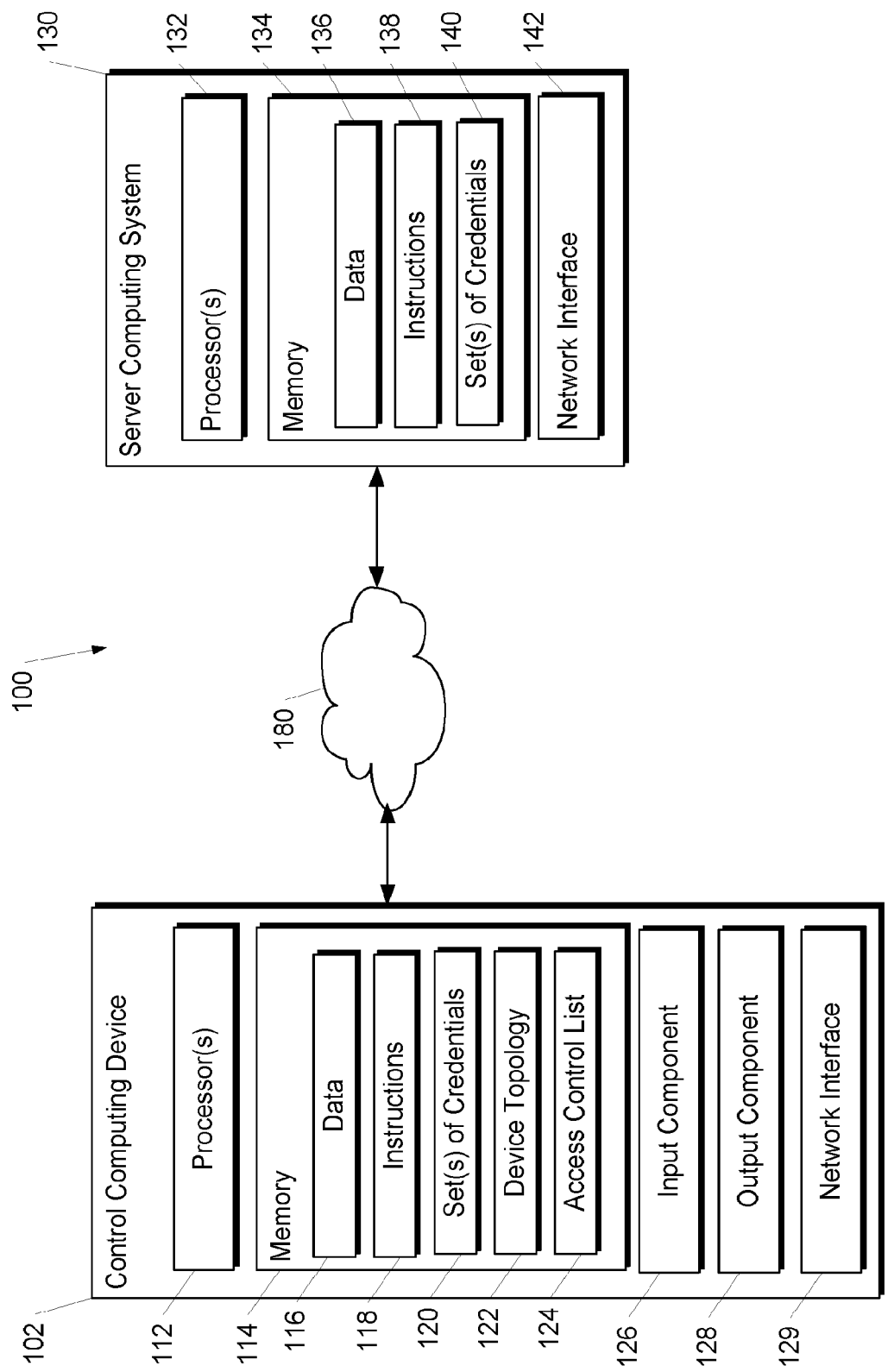
FIG. 2 depicts a block diagram of example computing devices according to example embodiments of the present disclosure.

FIG. 2 depicts a block diagram of an example computing system according to example embodiments of the present disclosure. The example system includes a control computing device 102 and a server computing system 130 that are communicatively coupled over a network 180.

The control computing device 102 can be any type of computing device, such as, for example, a smart device, a personal computing device (e.g., laptop or desktop), a mobile computing device (e.g., smartphone or tablet), a gaming console or controller, a wearable computing device, an embedded computing device, or any other type of computing device.

The control computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the control computing device 102 to perform operations.

In some implementations, the memory 114 can further store one or more sets of credentials 120. The sets of credentials 120 can include user credentials and/or structure credentials.

In some implementations, the memory 114 can further store a device topology 122. The device topology 122 can be constructed using various suitable techniques and can be any suitable format and/or structure capable of representing the topology and organization of one or more smart devices within one or more structures. The device topology 122 can define and/or organize one or more structures associated with the structure. A structure can be organized into one or more rooms (e.g. bedroom, living room, kitchen), and one or more smart devices can optionally be assigned to the one or more rooms. For instance, a user can assign one or more smart lights to a first room of a particular structure, and one or more door locking systems to a second room of the structure. The user can then assign one or more different smart devices to one or more rooms within a second structure.

The user can assign one or more identifiers to the smart devices within the device topology 122. The identifiers can be chosen by the user and associated with the respective smart devices within the device topology 122. The identifier(s) can include nicknames and/or aliases selected for the smart devices by the user (e.g. couch lamp, front door lock, bedroom speaker, etc.). In this manner, the identifiers can be names or aliases of the respective smart devices that the user is likely to use when controlling the smart devices.

The device topology 122 can further specify one or more device attributes associated with the respective devices. The device attributes can be associated with one or more actions that the smart devices are configured to perform. For instance, the device attributes associated with a lighting device can include a turn on capability, a turn off capability, a dimming capability, and/or other suitable attributes associated with the lighting device. As another example, an automatic door locking device can include a locking capability, an unlocking capability and/or other suitable capability.

In some implementations, the memory 114 can further store an access control list 124. The access control list 124 can include a list of permissions attached to a device, an application, and/or a service. In some examples, the access control list 124 can provide access, control, or other permissions to a device, an application, and/or a service based on structure credentials associated with a structure identifier. Thus, the structure can be viewed as an entity to which permissions are granted by the access control list 124 and any user located within the structure can control devices according to the permissions granted to the structure identifier.

In some implementations, the control computing device 102 can also include one or more user input components 126 that receive user input. For example, the user input components 126 can include a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components 126 include a microphone, a traditional keyboard, or other means by which a user can enter a communication.

In some implementations, the control computing device 102 can also include one or more output components 128 that provide an output. For example, the output components 128 can include a display screen, speaker, haptic outputs, lights, or other output components.

The control computing device 102 can include a network interface 129 for communicating with server 130 over network 180. Network interface 129 can include any components or configuration suitable for communication with server 130 over network 180, including, for example, one or more ports, transmitters, wireless cards, controllers, physical layer components, or other items for communication according to any currently known or future developed communications protocol or technology.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the memory 134 can further store one or more sets of credentials 140. The sets of credentials 140 can include user credentials and/or structure credentials.

The server computing system 130 can include a network interface 142 for communicating with device 102 over network 180. Network interface 142 can include any components or configuration suitable for communication with device 102 over network 180, including, for example, one or more ports, transmitters, wireless cards, controllers, physical layer components, or other items for communication according to any currently known or future developed communications protocol or technology.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2 illustrates one example computing system that can be used to implement the present disclosure. Other computing systems can be used as well.

Example Methods

Figure 3:
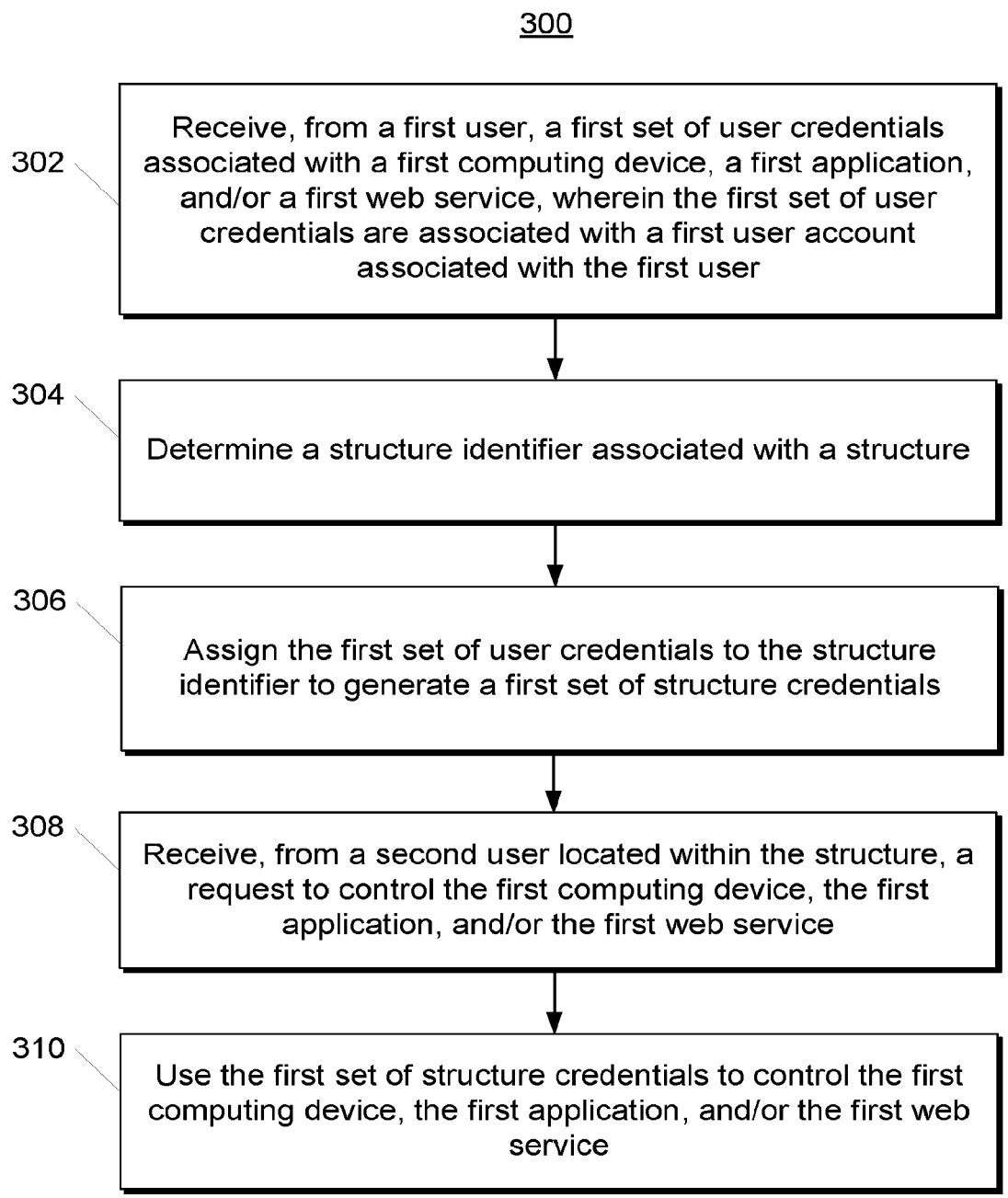
FIG. 3 depicts a flowchart diagram of an example method to perform structure-based access control according to example embodiments of the present disclosure.

FIG. 3 depicts a flowchart diagram of an example method 300 to perform structure-based access control according to example embodiments of the present disclosure.

At 302, a computing system receives, from a first user, a first set of user credentials associated with a first computing device, a first application, and/or a first web service. The first set of user credentials can be associated with a first user account associated with the first user.

The first user can indicate that he or she would like to assign the first set of user credentials to the structure (e.g., via a user input such as, for example, a voice command). In one example, the first user may have previously been designated as a "manager" of the control computing device and/or one or more additional smart devices. For example, the first user may be a user that deployed, installed, or otherwise set up the control computing device within the structure.

At 304, the computing system can determine a structure identifier associated with a structure. As an example, when first deployed by a user, such user may have entered a particular name or other identifier for the corresponding structure (e.g., "Family Lakehouse"). As another example, an identifier may have been programmed into the control computing device by the manufacturer and such identifier can be assigned to the structure as the structure identifier when the control computing device is first deployed into the structure. As another example, when first deployed within the structure, the control computing device can interact with a registration server to receive a structure identifier.

At 306, the computing system can assign the first set of user credentials to the structure identifier to generate a first set of structure credentials. For example, assigning the credentials at 306 can be performed in response to a user instruction that he or she would like to assign the first set of user credentials to the structure (e.g., via a user input such as, for example, a voice command).

As one example, assigning the first set of user credentials to the structure identifier can include using the first set of user credentials to obtain an authentication token from a web server; and storing the authentication token at a control computing device.

At 308, the computing system can receive, from a second user located within the structure, a request to control the first computing device, the first application, and/or the first web service. As one example, receiving, from the second user located within the structure, the request to control can include receiving, from a second computing device associated with the second user, a request to control the first application. In some instances, the first application may not be installed on the second computing device.

At 310, the computing system can use the first set of structure credentials to control the first computing device, the first application, and/or the first web service to satisfy the request from the second user located within the structure.

In such fashion, multiple users within a structure, who may be part of a collaborative user group, can access devices, applications, and/or services using structure credentials, thereby eliminating the onerous requirement of switching between user-specific accounts to access different devices/services/etc. respectively associated with such accounts. Thus, in one example, a husband can assign his specific user credentials for a music streaming application to the home. Thereafter, various users (e.g., a wife) within the home can access the music streaming application while still accessing other device/services/etc. that are not assigned to the husband's specific user account (e.g., a calendar application associated with the wife's user account).

Figure 4:
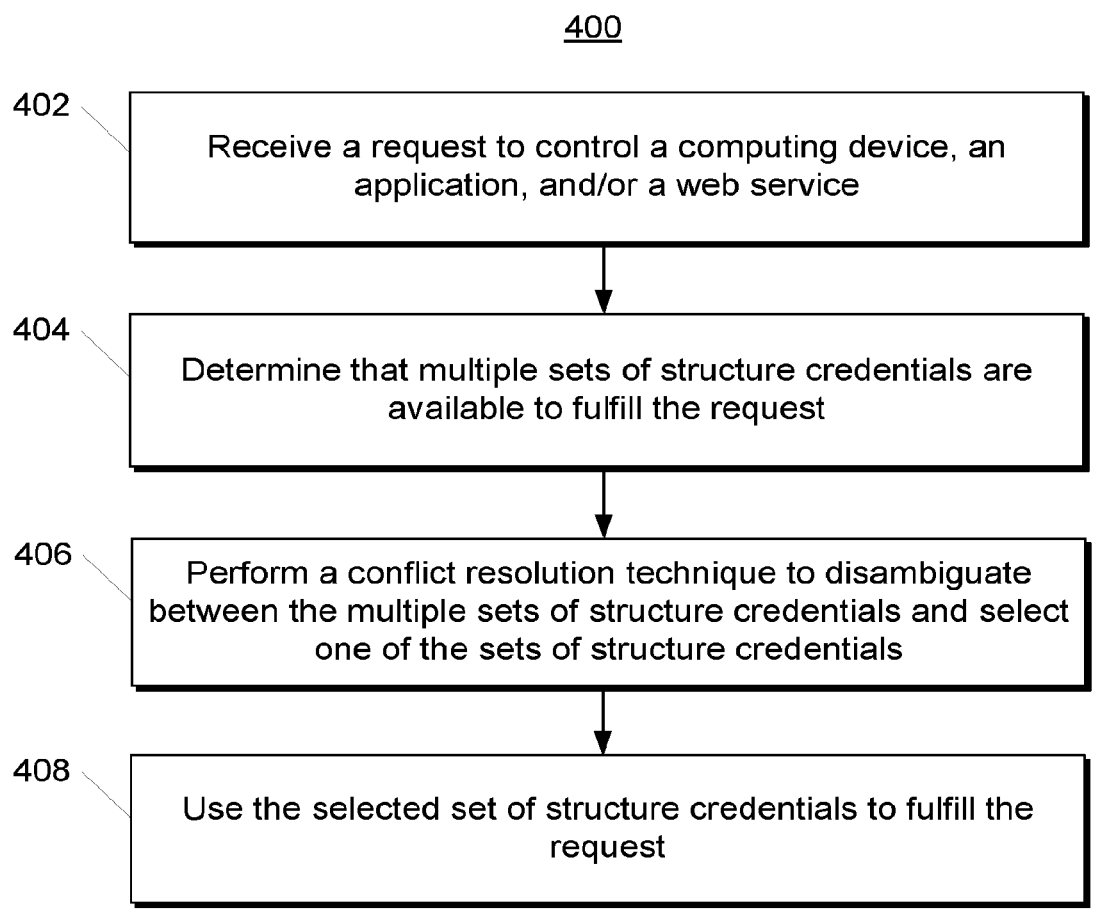
FIG. 4 depicts a flowchart diagram of an example method to perform structure-based access control according to example embodiments of the present disclosure.

FIG. 4 depicts a flowchart diagram of an example method 400 to perform structure-based access control according to example embodiments of the present disclosure.

At 402, a computing system can receive a request to control a computing device, an application, and/or a web service. For example, the request can be a voice request.

At 404, the computing system can determine that multiple sets of structure credentials are available to fulfill the request. For example, both a first set of structure credentials derived from a first user and a second set of structure credentials derived from a second user may be available to fulfill the request.

At 406, the computing system can perform a conflict resolution technique to disambiguate between the multiple sets of structure credentials and select one of the sets of structure credentials.

As one example, in instances in which the request received at 402 is a voice request, performing the conflict resolution at 406 can include performing voice recognition on the voice request to recognize the second user. In response to recognition of the second user, the computing system can automatically using the second set of structure credentials to fulfill the request.

As another example, performing the conflict resolution at 406 can include iteratively and individually analyzing each set of structure credentials assigned to the structure identifier to identify a first available set of structure credentials that enable satisfaction of the request. The computing system can use the first available set of structure credentials to control fulfill the request.

Thus, for example, the computing system can start with a first set of structure credentials and assess whether such structure credentials can be used to satisfy the request. If so, the computing system can use such first set of structure credentials; and, if not, then the computing system can move to a second set of structure credentials and assess whether such structure credentials can be used to satisfy the request. Thus, the computing system can use the first available set of structure credentials to fulfill the request.

As yet another example, performing the conflict resolution at 406 can include analyzing each set of structure credentials assigned to the structure identifier to identify a premier set of structure credentials that have, relative to other sets of structure credentials, a premier group of permissions. As one example, a first set of structure credentials for a music streaming application can correspond to a standard account type while a second set of structure credentials for the music streaming application can correspond to a premium account type. Thus, the computing system can analyze the first and second sets of structure credentials and determine that the second set of structure credentials is the premier set of credentials that provides a premier group of permissions. The computing system can use the premier set of structure credentials to fulfill the request.

As another example, performing the conflict resolution at 406 can include engaging in a question and answer routine with the user to disambiguate between the plurality of sets of structure credentials. For example, the question and answer routine can include the computing system providing a question (e.g., play an audio question over a speaker) and receiving an answer from the user (e.g., receiving a voice answer from the user). For example, the question can request that the user specify one of the available sets of structure credentials and the answer can specify a particular set of structure credentials.

At 408, the computing system can use the selected set of structure credentials to fulfill the request.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 3 and 4 respectively depict steps performed in a particular order for purposes of illustration and discussion, the methods of the present disclosure are not limited to the particularly illustrated order or arrangement. The various steps of the methods 300 and 400 can be omitted, rearranged, combined, and/or adapted in various ways without deviating from the scope of the present disclosure.

What is claimed is:

1. A computer system, comprising:
a control computing device physically located within a physical structure, and wherein the control computing device comprises one or more processors and one or more non-transitory computer-readable media that store instructions that, when executed by the one or more processors, cause the control computing device to perform operations, the operations comprising:
receiving, from a first user, a first set of user credentials for one or more of: a first computing device physically located within the physical structure, a first application, or a first web service;
receiving a structure identifier assigned to the physical structure;
assigning the first set of user credentials to the structure identifier to generate a first set of structure credentials that are distinct from the first set of user credentials, wherein the first set of structure credentials enables one or more authorized users, distinct from the first user, to access the one or more of the first computing device, the first application, or the first web service;
receiving, from a second user, a request to control the one or more of the first computing device, the first application, or the first web service;
in response to receiving the request from the second user, determining whether the second user is one of the one or more authorized users; and
in response to determining that the second user is one of the one or more authorized users, using the first set of structure credentials to enable the second user to access the one or more of the first computing device, the first application, or the first web service.

2. The computer system of claim 1, wherein determining whether the second user is one of the one or more authorized users comprises:
determining whether the second user is within the physical structure,
in response to determining that the second user is within the physical structure, determining that the second user is an authorized user, of the one or more authorized users, and
in response to determining that the second user is not within the physical structure, determining that the second user is not one of the one or more authorized users.

3. The computer system of claim 1, wherein the request from the second user is a voice command, and determining whether the second user is one of the one or more authorized users comprises:
processing the voice command using voice recognition; and
determining whether the second user is one of the one or more authorized users based on the processed voice command.

4. The computer system of claim 1, wherein the control computing device is a smart speaker located within the physical structure, and wherein the physical structure is a dwelling for the first user and/or the second user.

5. The computer system of claim 1, wherein the structure identifier is programmed into the control computing device by a manufacturer of the physical structure, or is generated based on input from the first user.

6. The computer system of claim 1, wherein assigning the first set of user credentials to the structure identifier comprises:
using the first set of user credentials to obtain an authentication token from a web server; and
storing the authentication token locally at the control computing device.

7. The computer system of claim 1, wherein receiving, from the second user located within the structure, the request to control comprises:
receiving, from a second computing device associated with the second user, the request to control the first application, wherein the first application is not installed on the second computing device.

8. The computer system of claim 1, wherein the operations further comprise:
receiving, from the second user, a second set of user credentials associated with the one or more of the first computing device, the first application, or the first web service; and
assigning the second set of user credentials to the structure identifier to generate a second set of structure credentials that are distinct from the first set of user credentials and that are distinct from the second set of user credentials.

9. The computer system of claim 8, wherein the operations further comprise:
receiving, from the second user, a second request to control the one or more of the first computing device, the first application, or the first web service, wherein the second request comprises a verbal request;
performing voice recognition on the second request to recognize the second user; and
in response to the second request and recognition of the second user, automatically using the second set of structure credentials to control the one or more of the first computing device, the first application, or the first web service.

10. The computer system of claim 8, wherein the operations further comprise:
- receiving, from the second user, a second request to control the one or more of the first computing device, the first application, or the first web service;
- in response to the second request, iteratively and individually analyzing each set of structure credentials assigned to the structure identifier to identify a first available set of structure credentials that enable satisfaction of the second request; and
- using the first available set of structure credentials to control the one or more of the first computing device, the first application, or the first web service.

11. The computer system of claim 8, wherein the operations further comprise:
- receiving, from the second user, a second request to control the one or more of the first computing device, the first application, or the first web service;
- in response to the second request, analyzing each set of structure credentials assigned to the structure identifier to identify a premier set of structure credentials that have, relative to other sets of structure credentials, a premier group of permissions; and
- using the premier set of structure credentials to control the one or more of the first computing device, the first application, or the first web service.

12. The computer system of claim 8, wherein the operations further comprise:
- receiving, from the second user, a second request to control the one or more of the first computing device, the first application, or the first web service;
- in response to the second request, determining that a plurality of sets of structure credentials are available to enable satisfaction of the second request; and
- in response to determining that the plurality of sets of structure credentials are available, engaging in a question and answer routine with the second user to disambiguate between the plurality of sets of structure credentials.

13. A computer-implemented method, comprising:
- receiving, from a first user, a first set of user credentials for accessing one or more of: a first computing device physically located within a physical structure, a first application, or a first web service;
- receiving a structure identifier for the physical structure;
- assigning the first set of user credentials to the structure identifier to generate a first set of structure credentials, wherein the first set of structure credentials are distinct from the first set of user credentials, and wherein the first set of structure credentials enables one or more authorized users, distinct from the first user, to access the one or more of the first computing device, the first application, or the first web service;
- receiving, from a second user, a request to control the one or more of the first computing device, the first application, or the first web service; and
- in response to receiving the request from the second user, determining whether the second user is one of the one or more authorized users; and
- in response to determining that the second user is one of the one or more authorized users, using the first set of structure credentials to enable the second user to access the one or more of the first computing device, the first application, or the first web service, without the second user knowing the first set of user credentials.

14. The method of claim 13, wherein determining whether the second user is one of the one or more authorized users comprises:
- determining whether the second user is within the physical structure,
- in response to determining that the second user is within the physical structure, determining that the second user is an authorized user, of the one or more authorized users, and
- in response to determining that the second user is not within the physical structure, determining that the second user is not an authorized user, of the one or more authorized users.

15. The method of claim 13, wherein assigning the first set of user credentials to the structure identifier comprises:
- using the first set of user credentials to obtain an authentication token from a web server; and
- mapping the authentication token to the structure identifier.

16. The method of claim 13, wherein receiving, from the second user located within the structure, the request to control comprises:
- receiving, from a second computing device associated with the second user, the request to control the first application,
- wherein the first application is not installed on the second computing device.

17. The method of claim 13, further comprising
- receiving, from the second user, a second set of user credentials associated with the one or more of the first computing device, the first application, or the first web service; and
- assigning the second set of user credentials to the structure identifier to generate a second set of structure credentials that are distinct from the first set of user credentials and that are distinct from the second set of user credentials.

18. The method of claim 17, further comprising:
- receiving, from the second user, a second request to control the one or more of the first computing device, the first application, or the first web service, wherein the second request comprises a verbal request;
- performing voice recognition on the second request to recognize the second user; and
- in response to the second request and recognition of the second user, automatically using the second set of structure credentials to control the one or more of the first computing device, the first application, or the first web service.

19. The method of claim 17, further comprising:
- receiving, from the second user, a second request to control the one or more of the first computing device, the first application, or the first web service;
- in response to the second request, analyzing each set of structure credentials assigned to the structure identifier to identify a premier set of structure credentials that have, relative to other sets of structure credentials, a premier group of permissions; and
- using the premier set of structure credentials to control the one or more of the first computing device, the first application, or the first web service.

20. A computer-implemented method, comprising:
- receiving, from a first user, a first set of user credentials for accessing one or more of: a first computing device physically located within a physical structure, a first application, or a first web service;

receiving a structure identifier for the physical structure;
using the first set of user credentials to obtain an authentication token from a web server;
storing the authentication token at the first computing device or another computing device physically located within the physical structure;
receiving, from a second user, a request to control the one or more of the first computing device, the first application, or the first web service;
in response to receiving the request from the second user, determining whether the second user is one of the one or more authorized users; and
in response to determining that the second user is one of the one or more authorized users, retrieving the authentication token to enable the second user to access the one or more of the first computing device, the first application, or the first web service.

\* \* \* \* \*